(12) United States Patent
Horiuchi et al.

(10) Patent No.: US 7,244,525 B2
(45) Date of Patent: Jul. 17, 2007

(54) FUEL CELL STRUCTURE

(75) Inventors: Michio Horiuchi, Nagano (JP); Shigeaki Suganuma, Nagano (JP); Misa Watanabe, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 572 days.

(21) Appl. No.: 10/687,599

(22) Filed: Oct. 20, 2003

(65) Prior Publication Data

US 2004/0086761 A1    May 6, 2004

(30) Foreign Application Priority Data

Oct. 21, 2002   (JP)   ............... 2002-305769

(51) Int. Cl.
*H01M 8/18* (2006.01)
(52) U.S. Cl. .................. 429/20; 429/26; 429/30; 429/31; 429/32
(58) Field of Classification Search .................. 429/30, 429/33, 40, 41, 44, 20, 26, 31, 32
See application file for complete search history.

(56) References Cited

U.S. PATENT DOCUMENTS 6,004,688 A  * 12/1999  Goodenough et al. ........ 429/33

FOREIGN PATENT DOCUMENTS

| EP | 1 261 060 | 5/2002 |
|---|---|---|
| EP | 1 294 036 | 9/2002 |
| JP | 06-036782 | 7/1992 |
| JP | 06-196176 | 12/1992 |
| JP | 6-196176 | 7/1994 |

* cited by examiner

*Primary Examiner*—Bruce F. Bell
(74) *Attorney, Agent, or Firm*—Staas & Halsey LLP

(57) ABSTRACT

A fuel cell generates electric power when the solid oxide type fuel cell element is arranged in a flame or in a position close to the flame, and the durability of the fuel cell is high. A fuel cell 10 for generating electricity when the solid oxide type fuel cell, in which a cathode layer is formed on one face of a solid electrolyte layer and an anode layer is formed on the other face of the solid electrolyte layer, is arranged in a flame or in a position close to the flame, wherein the solid electrolyte layer is made of porous material, the porosity of which is not less than 10%, so that cracks are not caused in the solid electrolyte layer by a sudden temperature change in the solid oxide type fuel cell when the solid oxide type fuel cell is arranged in the flame or in a position close to the flame or when the solid oxide type fuel cell is separated from the flame or the position close to the flame.

10 Claims, 3 Drawing Sheets

FUEL CELL STRUCTURE

BACKGROUND OF THE INVENTION

1. Field of the Invention

The present invention relates to a fuel cell. More particularly, the present invention relates to a fuel cell structure used when a solid oxide type fuel cell element is arranged in a flame or in a portion close to the flame.

2. Description of the Related Art

Conventionally, there is proposed a fuel cell in which a solid oxide type fuel cell element is arranged in a flame or in a portion close to the flame and the temperature of the solid oxide type fuel cell element is maintained at its operation temperature by the heat of the flame so as to generate electricity. For example, this solid oxide type fuel cell is disclosed in the official gazette of JP-A-6-196176 (item [0019], FIG. 5).

The official gazette of JP-A-6-196176 discloses a solid oxide type fuel cell including: a tube body made of zirconia solid electrolyte; a fuel electrode arranged outside the tube body; and an air electrode arranged inside the tube body, wherein the solid oxide type fuel cell is arranged so that the fuel electrode is exposed to a reducing flame portion of the flame. This fuel cell generates electricity in such a manner that radicals and others existing in the reducing flame are utilized as fuel and air is supplied into the tube by means of convection or diffusion.

In this type fuel cell, the flame is directly used. Therefore, the electro-motive time can be reduced. Further, the structure of the fuel cell is so simple that the size and weight can be reduced, by which the manufacturing cost can be advantageously lowered. Furthermore, it is possible to utilize a combustion device, an incinerator and the like as an electric power supply device. Therefore, the utility value of this type fuel cell is high.

However, since the solid oxide type fuel cell element is directly heated by a flame, cracks tend to be caused by a sudden temperature change. The solid oxide type fuel cell element, in which cracks are caused, breaks up afterward. Therefore, it becomes impossible to generate electricity.

SUMMARY OF THE INVENTION

The present invention has been accomplished to solve the above mentioned-problems of the related art.

It is therefore an object of the present invention to provide a fuel cell in which electricity is generated when the solid oxide type fuel cell element is arranged in a flame or in a portion close to the flame and the durability of the fuel cell is high.

In order to accomplish the above object, the present inventors made investigations and obtained the following knowledge. In general, a cathode layer and an anode layer are made of porous material so that gas can smoothly pass through the cathode layer and the anode layer. On the other hand, a solid electrolyte layer is so densely formed that the thermal shock resistance is low. Therefore, cracks caused by a sudden temperature change on the solid electrolyte layer becomes a trigger, and the entire solid oxide type fuel cell cracks and breaks up. Accordingly, the inventors of the present application thought that the thermal shock resistance of the solid oxide type fuel cell element can be enhanced when the solid electrolyte player is made of porous material. In this way, the present invention has been accomplished.

According to the present invention, there is provided a fuel cell comprising a solid oxide type fuel cell element comprising a solid electrolyte layer having respective faces, a cathode layer formed on one of faces of the solid electrolyte layer and an anode layer formed on the other face of the solid electrolyte layer, wherein said element generates electricity when said solid oxide type fuel cell element is arranged in a flame or in a portion close to the flame; the solid electrolyte layer being made of porous material, the porosity of which is not less than 10%, so that cracks can not be caused on the solid electrolyte layer by a sudden temperature change in the solid oxide type fuel cell when the solid oxide type fuel cell is arranged in the flame or in the portion close to the flame or when the solid oxide type fuel cell is separated from the flame or the portion close to the flame.

When the solid electrolyte layer is formed of porous material, the thermal shock resistance can be enhanced.

The present invention provides a fuel cell, wherein a mesh-shaped metal or a wire-shaped metal is embedded in or fixed to at least one of the anode layer and the cathode layer so as to reinforce the anode layer or the cathode layer.

Due to the foregoing, even when cracks are caused in the solid oxide type fuel cell, it can be reinforced by the mesh-shaped metal or wire-shaped metal. Therefore, the solid oxide type fuel cell does not break up, and further an electrical connection can be accomplished by the mesh-shaped metal or wire-shaped metal. Accordingly, the electricity generating capacity as a fuel cell can be maintained.

When the solid oxide type fuel cell is formed flat, a flame can be uniformly blown to the solid oxide type fuel cell, which is advantageous.

When the anode layer is arranged on the flame side, it becomes easy for radicals existing in the flame to be used as fuel for generating electricity according to the oxidizing and reducing reaction.

When the cathode layer is arranged so that it can be exposed to gas containing oxygen, oxygen can be easily utilized from the cathode layer. Further, when gas containing oxygen is blown to the cathode layer, oxygen can be more effectively utilized from the cathode layer.

When the flame is generated when organic substance is used as fuel, it is possible to use a simple incinerator in which complicated devices such as an exhaust gas processing device and the like are not required.

When the flame is a premixed flame, it is possible to prevent the generation of soot by adjusting the concentration of fuel. Since it becomes possible to prevent soot from being attached to the solid oxide type fuel cell, deterioration in the electricity generating capacity can be prevented.

It is preferable that the anode layer is composed of a sintered body, the primary component of which is conductive oxide. Due to the foregoing, deterioration of the efficiency of generating electricity and incompetence of generating electricity, which are caused by oxidation of the anode layer, can be prevented. Further, it is possible to prevent the anode layer from peeling off from the solid electrolyte layer. It is preferable that the conductive oxide is nickel oxide in which lithium is solidly dissolved.

THE MOST PREFERRED EMBODIMENT

Figure 1:
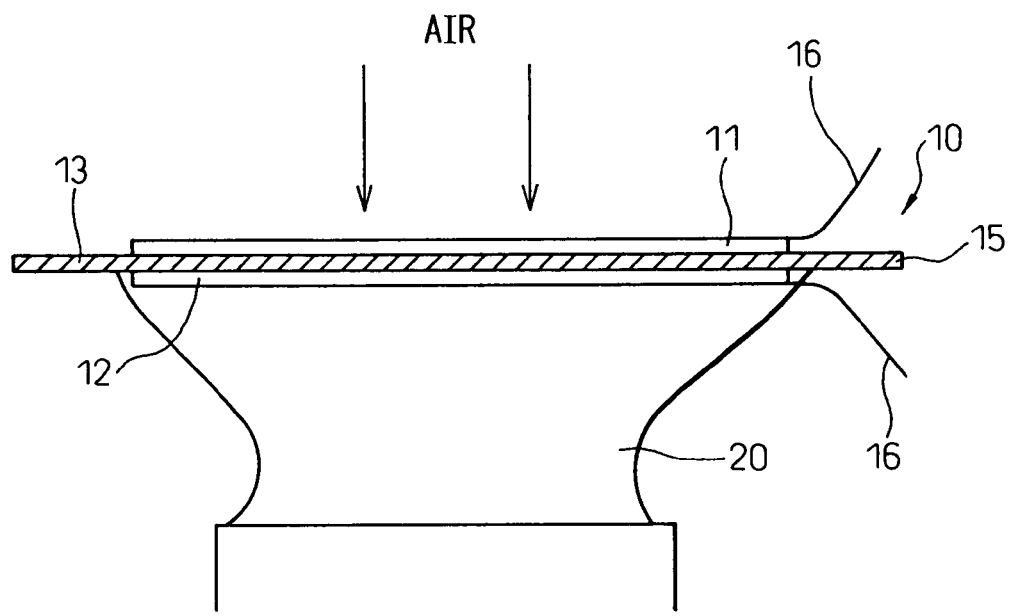
FIG. 1 is a sectional view for explaining a structure of a fuel cell of the present invention.
Figure 2:
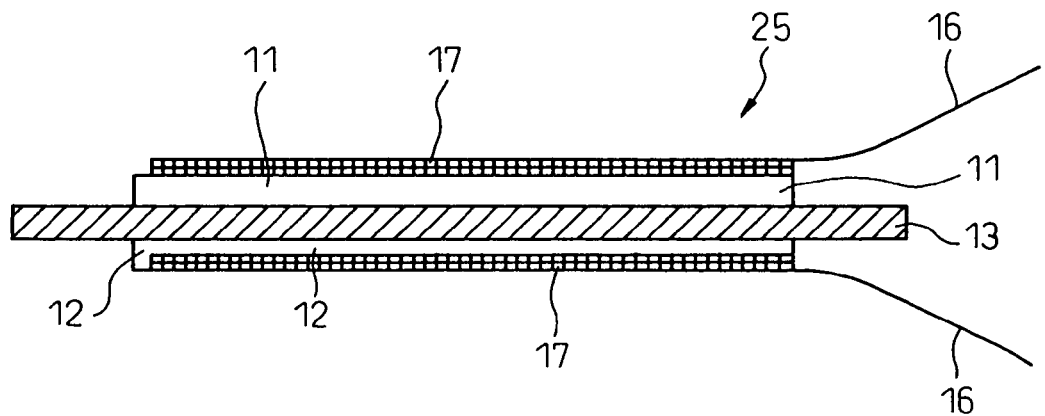
FIG. 2 is a sectional view showing an example of a solid oxide type fuel cell of the present invention.

Referring to the accompanying drawings, the preferred embodiment of the present invention will be explained below. FIG. 1 is a sectional view for explaining a structure of a fuel cell of the present invention. FIG. 2 is a sectional view showing an example of a solid oxide type fuel cell element used for a fuel cell of the present invention.

As shown in FIG. 1, the solid oxide type fuel cell element 15 used for the fuel cell of the present invention is composed in such a manner that the cathode layer 11 is provided on one face of the solid electrolyte layer 13 and the anode layer 12 is provided on the other face and the entire solid oxide type fuel cell element 15 is formed flat. When the solid oxide type fuel cell element 15 is arranged in the flame 20 or in a portion close the flame 20 while the anode layer 12 is being directed to the flame 20 side, electricity is generated.

Electric power generated by the solid oxide type fuel cell element 15 is taken out by the leads 16, 16 which are respectively drawn out from anode layer 12 and the cathode layer 11. The leads 16, 16 are made of platinum or platinum alloy, the heat resistance property of which is high.

Since the solid oxide type fuel cell 15 is formed flat, it is possible to blow a flame onto the solid oxide type fuel cell element 15 more uniformly than a fuel cell element formed into a tube-shape. Further, it is advantageous that the anode layer 12 is arranged being directed toward the flame side, because hydrocarbon, hydrogen, radicals (OH, CH, $C_2$, $O_2H$ and $CH_3$) existing in the flame can be more easily utilized as fuel.

When the solid oxide type fuel cell 15 is formed flat, it is possible to completely shut off the flame as shown in FIG. 1. Therefore, while the anode layer 12 is being directed toward the flame side, the cathode layer 11 can be more effectively exposed to the atmospheric air. Due to the foregoing, it is possible for the cathode layer 11 to utilize oxygen contained in the atmospheric air more easily. Further, as shown by the arrow in FIG. 1, gas such as air or oxygen-rich gas may be blown to the cathode layer 11 so that the cathode layer 11 can be more effectively utilize oxygen.

The solid oxide type fuel cell element 15 is arranged in the flame or in a portion close to the flame. Therefore, hydrocarbon, hydrogen, radicals existing in the flame can be effectively utilized as fuel. Even the anode layer, which tends to be deteriorated by oxidation, can be steadily used and the durability can be maintained over a long period of time.

Concerning the fuel to be burned, as long as it is oxidized and burned being accompanied by a flame, any fuel can be used. Accordingly, phosphorus, sulfur, fluorine, chlorine and chemical compounds of them may be used as the fuel. In this case, it is preferable to use organic substance, the exhaust gas processing of which is unnecessary. Examples of the organic substance fuel are: gas such as methane, ethane, propane and butane; liquid fuel of gasoline such as hexane, heptane and octane; alcohol such as methanol, ethanol and propanol; ketone such as acetone; various organic solvents; edible oil; kerosene; paper; and wood. Especially, gas fuel is preferably used.

The flame may be a diffusion flame or a premixed flame. However, since the diffusion flame is not stable and generates so much soot that the function of the anode layer tends to be deteriorated by the soot. Therefore, it is preferable to use the premixed flame. It is advantageous to use the premixed flame, because the premixed flame is stable and further the flame size of the premixed flame can be easily adjusted and further it is possible to prevent the generation of soot by adjusting the fuel concentration.

Concerning the solid electrolyte layer 13, for example, it is possible to use a well known solid electrolyte layer. However, the following solid electrolyte layers may be preferably used.

(1) YSZ (yttria stabilized zirconia), ScSZ (scandium stabilized zirconia) and zirconia ceramics in which Ce, Al or the like is doped into YSZ or ScSZ.

(2) Ceria ceramics such as SDC (samarium doped ceria) or SGC (gadorinium doped ceria).

(3) LSGM (lanthanum gallate) or oxidized bismuth ceramics.

Concerning the anode layer 12, it is possible to adopt a well known anode layer. Preferable examples of the anode layer are as follows.

(1) Cermet of nickel and ceramics of yttria stabilized zirconia, scandium stabilized zirconia, or ceria (SDC, GDC, YDC and the like).

(2) Sintered body, the primary component of which is conductive oxide (not less than 50 wt % and not more than 99 wt %).

Examples of the conductive oxide are nickel oxide into which lithium is solidly dissolved.

(3) Material in which platinum or its oxide is added to the material described in item (1) or (2) by 1 to 10 wt %.

In the above three items, item (2) or (3) is more preferable.

Resistance to oxidation of the sintered body, the primary component of which is the conductive oxide described in item (2), is high. Therefore, it is possible to prevent the deterioration of the electric power generation efficiency, the incompetence of electric power generation and the separation of the anode layer from the solid electrolyte layer which are caused by an increase in the electrode resistance of the anode layer caused by the oxidation of the anode layer. Concerning the conductive oxide, nickel oxide into which lithium is solidly dissolved can be preferably used.

Further, when an element of platinum group, a metal made of rhenium or its oxide is blended to the materials described in items (1) and (2), it is possible to obtain a high electric power generation performance.

Concerning the cathode layer 11, it is possible to use a well known cathode layer. Examples of the cathode layer are: manganese of lanthanum (for example, lanthanum strontium manganite) to which the third group element of the periodic table such as strontium (Sr) is added; and gallium oxide compound or cobalt oxide compound (for example, lanthanum strontium cobaltite).

Both the anode layer and the cathode layer are composed of a porous body. Further, in the present invention, the solid electrolyte layer is also composed of a porous body.

Conventionally, a solid electrolyte layer is so densely formed that the thermal shock resistance is low. Therefore, cracks tend to be caused by a sudden temperature change on the solid electrolyte layer. In general, the thickness of the solid electrolyte layer is larger than the thickness of the anode layer and cathode layer. Therefore, cracks caused by a sudden temperature change on the solid electrolyte layer becomes a trigger of cracks, and the entire solid oxide type fuel cell element cracks and breaks up.

Since the solid electrolyte layer is composed of a porous body, even when the solid electrolyte layer is arranged in a flame or in a portion close to the flame and given a sudden thermal change, and even when the solid electrolyte layer is subjected to a heat cycle, the temperature difference of which is large, no cracks are caused and the thermal shock resistance is enhanced. Even if the solid electrolyte layer was made of a porous body, when the porosity was lower than 10%, the thermal shock resistance could not be remarkably enhanced, however, when the porosity was not less than 10%, the thermal shock resistance could be enhanced. Further, when the porosity was not less than 20%, the thermal shock resistance could be more preferably enhanced.

The reason why the thermal shock resistance can be enhanced is estimated as follows. Since the solid electrolyte layer is porous, the thermal expansion caused by heating is relieved by gap portions formed in the porous body. Therefore, it is desirable to design in such a manner that the porosity is determined while giving consideration to the field of utilization of the fuel cell.

The solid oxide type fuel cell element is manufactured, for example, by the following manufacturing method.

First, material power of the solid electrolyte layer is blended by a predetermined ratio and formed into a flat-plate-shape. After that, the thus formed flat-plate-shaped body is burned and sintered so that a base board of the solid electrolyte layer is made. At this time, when the type of material powder such as a blow hole forming agent and the blending ratio are adjusted and when the burning conditions such as a burning temperature, burning time and preburning are adjusted, it is possible to make solid electrolyte layers of various porosity. One face of the base board of the thus obtained solid electrolyte layer is coated with paste which becomes a cathode layer, and the other face is coated with paste which becomes an anode layer. Then, the base board of the thus obtained solid electrolyte layer is burned. In this way, the solid oxide type fuel cell element can be manufactured.

When the solid oxide type fuel cell element is composed as shown in FIG. 2, the durability can be more enhanced.

In this structure, the mesh-shaped metal 17 is embedded in or fixed to the anode layer 12 and the cathode layer 11 of the flat-plate-shaped solid oxide type fuel cell element 15 shown in FIG. 1.

Concerning the method of embedding the mesh-shaped metal, the solid electrolyte layer is coated with material (paste) of each layer and the mesh-shaped metal is embedded in the coated material and then burned.

Concerning the method of fixing the mesh-shaped metal, the mesh-shaped metal may be bonded and sintered without completely embedding the mesh-shaped material in each layer.

Concerning the mesh-shaped metal 17, it is preferable to use metal, the coefficient of thermal expansion of which agrees with that of the anode layer and the cathode layer, and further the heat resistance property of which is high. A specific example of the mesh-shaped metal 17 is a mesh-shaped metal containing platinum or platinum alloy. Further, a specific example of the mesh-shaped metal 17 is stainless steel (SUS 304, 316 and 430). When stainless steel is used for the mesh-shaped metal 17, the manufacturing cost can be advantageously decreased.

Instead of the mesh-shaped metal 17, the wire-shaped metal may be embedded in or fixed to the anode layer and the cathode layer. The wire-shaped metal is made of the same metal as that of the mesh-shaped metal, and the number and the arranging profile of the wire-shaped metal are not particularly limited.

When the mesh-shaped metal or the wire-shaped metal is embedded in or fixed to the anode layer and the cathode layer, the solid oxide type fuel cell element, which has been cracked due to the thermal hysteresis, can be reinforced so that it can not break up. Further, the cracked portions of the mesh-shaped metal and the wire-shaped metal can be electrically connected.

Figure 3:
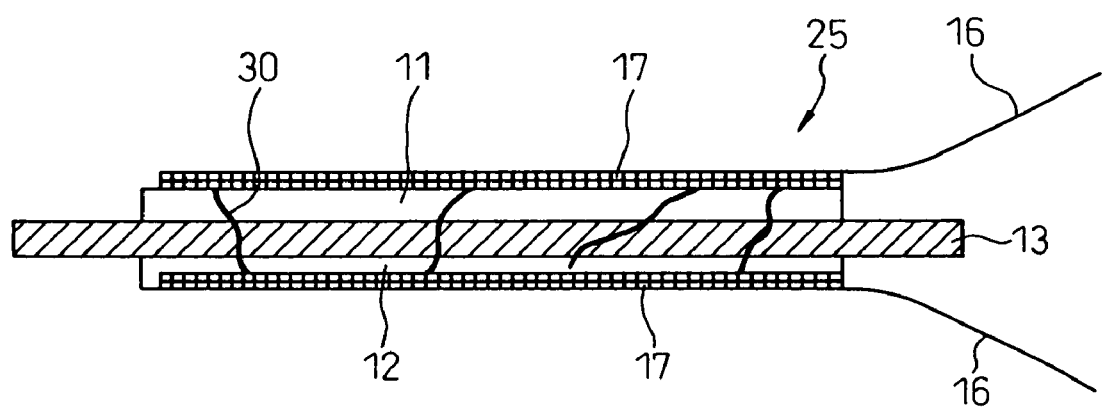
FIG. 3 is a sectional view for explaining a state in which cracks are caused on the solid oxide type fuel cell shown in FIG. 2.

Accordingly, even when the cracks 30 are caused in the solid oxide type fuel cell 25 in the process of generation of electric power by a heat cycle as shown in FIG. 3, in which an intensive temperature difference is caused, it is possible for the solid oxide type fuel cell element 25 to maintain its profile and continue the generation of electric power. Further, this reinforcing method is effective for a common solid electrolyte layer which is not porous.

The mesh-shaped metal or the wire-shaped metal may be arranged on both the anode layer and the cathode layer. Alternatively, the mesh-shaped metal or the wire-shaped metal may be arranged on one of the anode layer and the cathode layer. Alternatively, the mesh-shaped metal and the wire-shaped metal may be arranged being combined with each other.

In the case where cracks are caused due to a heat cycle, if the mesh-shaped or the wire-shaped metal is embedded at least in the anode layer, the generation of electric power can be continued without deteriorating the electric power generating capacity. As described above, the electric power generating capacity of the solid oxide type fuel cell greatly owes the effective area of the anode layer which functions as an electrode. Therefore, it is preferable that the mesh-shaped metal or the wire-shaped metal is arranged at least on the anode layer.

A range on each of the anode layer and the cathode layer in which the mesh-shaped metal or the wire-shaped metal is arranged is preferably a range, the area of which is not less than 50% and not more than 100% of the boundary area of the solid electrolyte layer and each layer. The anode layer or the cathode layer may be partially arranged in a portion where cracks tend to be caused.

Due to the foregoing, the mesh-shaped metal or the wire-shaped metal positively reinforces the solid oxide type fuel cell element and the electrical connection of the fuel cell element can be maintained.

EMBODIMENT 1

A ceramic base board of $Sm_{0.2}Ce_{0.8}O_{1.9}$ (samarium doped ceria: SDC), the porosity of which is approximately 20%, is used as the solid electrolyte layer. $La_{0.8}Sr_{0.2}MnO_3$ paste, to which SDC is added by 40 wt %, was printed as a cathode layer by about 1 $cm^2$ on one side of this ceramic base board (the area is 3 $cm^2$), and 16 mol % Li—$NiO_2$ paste was printed as an anode layer by about 1 $cm^2$ on the other face (the area is 3 $cm^2$) of the ceramic base board.

Then, the platinum mesh, which is a mesh-shaped metal formed by welding a platinum wire, was embedded in each printed face and burned for one hour at 1200° C. in the atmospheric air. In this way, the solid oxide type fuel cell element was made.

A premixed flame, the fuel of which was butane, was blown to the anode layer of the thus obtained solid oxide type fuel cell element. In this case, the size of the premixed flame was sufficiently large so that it came to the cathode layer side.

At this time, the solid oxide type fuel cell element was able to generate electric power without being cracked. As a result of the investigation into the generation of electric power, the maximum electric current was 88 mA and the maximum open circuit voltage was 0.47 V.

Further, the solid oxide type fuel cell element was subjected to a heat cycle test in which the premixed flame, which was blown to the anode layer, was repeatedly turned on and off. As a result of the heat cycle test, even if the premixed flame was turned on and off by 20 times, no cracks were caused.

EMBODIMENT 2

A premixed flame of a gas lighter was blown to the anode layer of the solid oxide type fuel cell element obtained in the same manner as that of Embodiment 1. At this time, the size of the flame was not so large that it did not come to the cathode layer side. In this case, the solid oxide type fuel cell element was able to generate electric power without causing any cracks, and the maximum electric current was 81 mA and the maximum open circuit voltage was 0.82 V.

EMBODIMENT 3

A diffusion flame of an alcohol lamp, the fuel of which was ethanol, was blown to the anode layer of the solid oxide type fuel cell obtained in the same manner as that of Embodiment 1.

In this case, the solid oxide type fuel cell element was able to generate electric power without causing any cracks, and the maximum electric current was 74 mA and the maximum open circuit voltage was 0.80 V.

EMBODIMENT 4

A diffusion flame of a candle was blown to the anode layer of the solid oxide type fuel cell element obtained in the same manner as that of Embodiment 1.

In this case, the solid oxide type fuel cell was able to generate electric power without causing any cracks, and the electric current fluctuated in the range from 2 to 30 mA, and the open circuit voltage fluctuates in the range from 0.01 to 0.5 V.

EMBODIMENT 5

A platinum wire connected to one of the anode layers of the two solid oxide type fuel cell elements obtained in the same manner as that of Embodiment 1 and a platinum wire connected to the other cathode layer were welded to each other, and a platinum wire connected to the remaining cathode layer and a platinum wire connected to the anode layer were connected to a multiple-meter. Under the condition that the two solid oxide type fuel cells were connected in series to each other, a diffusion flame of an alcohol lamp, the fuel of which was ethanol, was blown to the respective anode layers.

In this case, the solid oxide type fuel cell element was able to generate electric power without causing any cracks, and the maximum electric current was 46 mA and the maximum open circuit voltage was 1.64 V.

EMBODIMENT 6

A diffusion flame of burning kitchen paper was blown to the anode layer of the solid oxide type fuel cell obtained in the same manner as that of Embodiment 1. At this time, the solid oxide type fuel cell element was capable of generating electric power without causing any cracks. In this case, the electric current fluctuated in the range from 0.1 to 2 mA, and the maximum open circuit voltage was 0.80 V.

EMBODIMENT 7

A ceramic base board of $Sm_{0.2}Ce_{0.8}O_{1.9}$ (samarium doped ceria: SDC), the porosity of which was approximately 20%, was used as the solid electrolyte layer. $Sm_{0.5}Sr_{0.5}CoO_3$ paste, to which SDC was added by 50 wt %, was printed as a cathode layer by about 1 $cm^2$ on one side of this ceramic base board (the area was 3 $cm^2$), and 16 mol % Li—$NiO_2$ paste, to which $Rh_2O_3$ was added by 5 wt %, was printed by about 1 $cm^2$ as an anode layer on the other face (the area was 3 $cm^2$) of the ceramic base board.

Then, the platinum mesh, which is a mesh-shaped metal formed by welding a platinum wire, was embedded in each printed face and burned for one hour at 1100° C. in the atmospheric air. In this way, the solid oxide type fuel cell element was made.

A diffusion flame, the fuel of which was ethanol, was blown to the anode layer of the thus obtained solid oxide type fuel cell element. At this time, the solid oxide type fuel cell element was able to generate electric power without being cracked. The maximum electric current was 148 mA and the maximum open circuit voltage was 0.89 V.

EMBODIMENT 8

A platinum wire connected to one of the anode layers of the two solid oxide type fuel cell elements obtained in the same manner as that of Embodiment 7 and a platinum wire connected to the other cathode layer were welded to each other, and a platinum wire connected to the remaining cathode layer and a platinum wire connected to the anode layer were connected to a multiple-meter. Under the conditions that the two solid oxide type fuel cell elements were connected in series to each other, a diffusion flame of an alcohol lamp, the fuel of which was ethanol, was blown to the respective anode layers. In this case, the solid oxide type fuel cell element was able to generate electric power without causing any cracks, and the maximum electric current was 120 mA and the maximum open circuit voltage was 2.24 V.

EMBODIMENT 9

The solid oxide type fuel cell element was made in Embodiment 9 in the same manner as that of Embodiment 1 except for one point in which SDC ceramic base board, the porosity of which was approximately 10%, was used instead of SDC ceramic base board, the porosity of which was approximately 20%.

In the same manner as that of Embodiment 1, a premixed flame of a burner was blown to this solid oxide type fuel cell element. As a result, it was possible to generate electric power without causing any cracks. Investigations were made into the state of generating electric power, and it was recognized that the electric power generating capacity of Embodiment 9 was substantially the same as that of Embodiment 1.

After that, in the same manner as that of Embodiment 1, the solid oxide type fuel cell element was subjected to a heat cycle test in which a premixed flame, which was blown to the anode layer, was repeatedly turned on and off. As a result of the heat cycle test, when the premixed flame was turned on and off by 10 times, cracks were caused on the entire solid oxide type fuel cell element. However, the solid oxide type fuel cell element did not break up, and it was confirmed that the electric power generating capacity was substantially the same as that of Embodiment 1.

COMPARATIVE EXAMPLE 1

The solid oxide type fuel cell element was made in Comparative Example 1 in the same manner as that of Embodiment 1 except for two points that a dense SDC ceramic base board, the porosity of which was not more than 5%, was used instead of SDC ceramic base board, the porosity of which was approximately 20% and that the platinum mesh was not embedded in the printed face.

A premixed flame, the fuel of which was butane gas, was blown to the anode layer of the thus obtained solid oxide type fuel cell element in the same manner as that of Embodiment 1. As a result, SDC ceramic base board was cracked and the solid oxide type fuel cell element broke up into pieces.

When Embodiment 1 and Comparative Example 1 are compared with each other, it can be understood that the thermal shock resistance is enhanced when the porous solid electrolyte layer is used. Further, when Embodiment 1 and Embodiment 9 are compared with each other, it can be understood that an increase in the porosity is effective for improving the thermal shock resistance and the platinum mesh is effective for reinforcing the solid oxide type fuel cell element.

Figure 4:
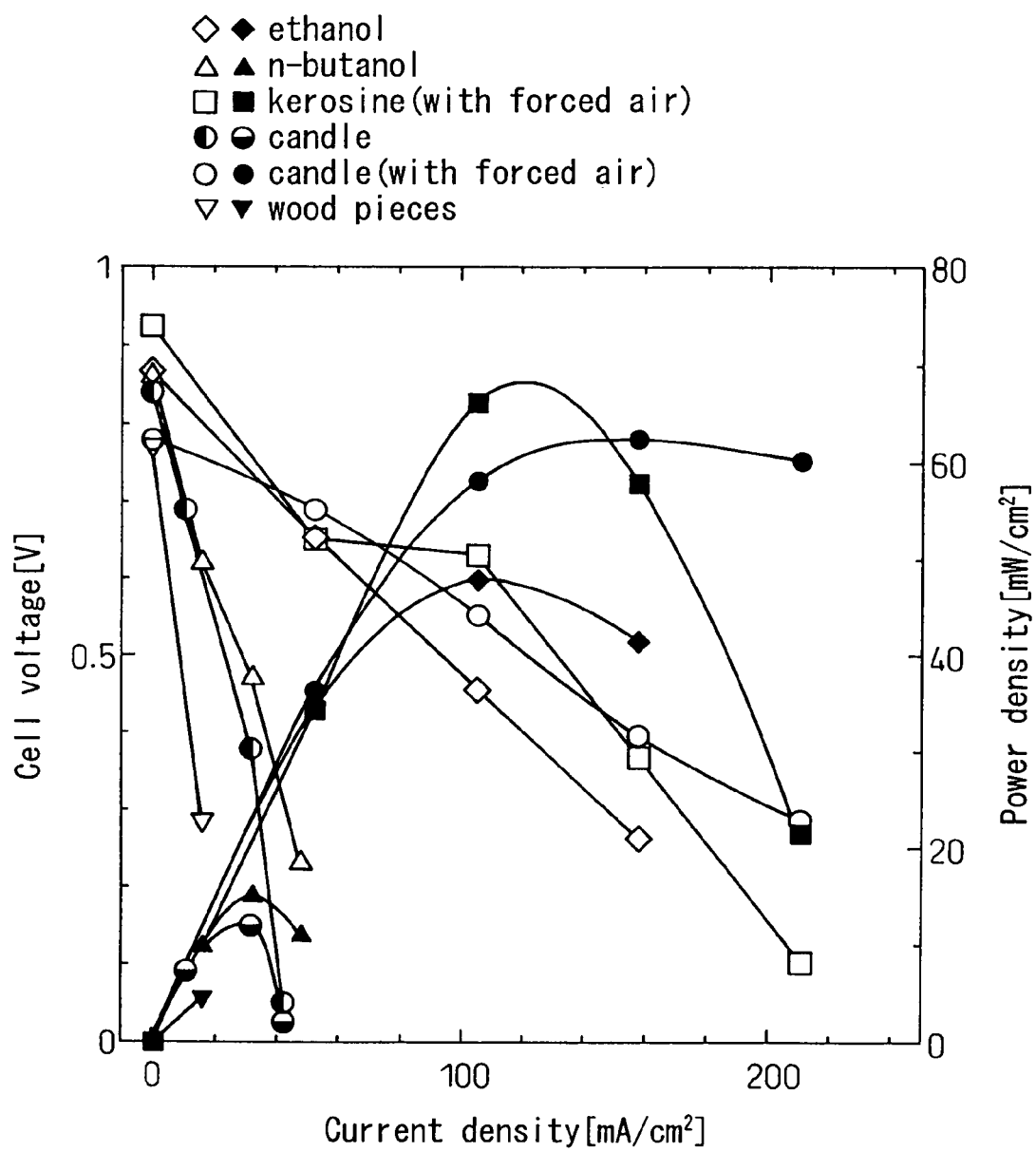
FIG. 4 shows experimental results using various material for fuel.

The inventors of this application further conducted experimentations using various liquid fuels and solid fuels as shown in FIG. 4.

The results of current density—cell voltage—power density measurements are summarized for the liquid fuels; ethanol, butanol, and kerosine; and for solid fuels; candle and wood pieces. For the liquid fuels of which molecule is larger than ethanol, soot formation was observed. While an increase in the power density with the increase in molecular weight was seen for the gas fuels, the power density of butanol was indicated lower than that of ethanol. This result is probably be caused by the oxygen deficiency. The diffusion flame of kerosine was extremely instable and showed a noticeable sooting. However, a slight amount of airflow to the wick diminished the soot formation and enhanced the power density to 66 mW/cm$^2$, considerably higher than that for ethanol.

The cell performance is also shown in FIG. 4 for the solid fuels; candle (paraffin wax) and wood pieces. While a natural flame of the candle gave output cell voltage (OCV) of 0.84 V, its output was up to 12 mW/cm$^2$. By a supply of slight air to the wick, the power density improved up to 62 mW/cm$^2$, here also, greater than that of ethanol. Although OCV reached around 0.8 V, the control of the flame was most difficult for the wood pieces, accordingly the lowest power density, 5 mW/cm$^2$ was obtained. These results strongly suggest that the flaming condition has a significant role for the output, and any fuel is able to liberate a higher power proper for the molecule, when an appropriate amount of air is given. Wood must become higher energy provider if it is flamed optimally.

The present invention is explained above referring to the preferred embodiments. However, it should be noted that the present invention is not limited to the above specific embodiments and variations may be made by one skilled in the art without departing from the scope and spirit of the invention as defined by the claims.

For example, a flame may be mainly used for holding the operation temperature of the solid oxide type fuel cell element and fuel may be supplied by a fuel supplying device.

A size of the fuel cell of the present invention can be easily decreased. Therefore, the fuel cell of the present invention can be used as a simple electric power supplying unit to operate an illuminating device, for example, to operate an illuminating device with a bonfire.

The invention claimed is:

1. A fuel cell electricity generator, comprising:
   a solid oxide type fuel cell element comprising a solid electrolyte layer having respective faces, a cathode layer formed on one of faces of the solid electrolyte layer and an anode layer formed on the other face of the solid electrolyte layer;
   means for supplying a flame; and
   means for supplying gas containing oxygen, wherein:
   said element generates electricity when said solid oxide type fuel cell element is arranged in the flame or in a position close to the flame, so that the anode layer is disposed on the flame side and the cathode layer is exposed to the gas containing oxygen;
   the solid electrolyte layer being made of porous material, the porosity of which is not less than 10%, so that cracks are not caused in the solid electrolyte layer by a sudden temperature change in the solid oxide type fuel cell when the solid oxide type fuel cell is disposed in the flame or in the position close to the flame or when the solid oxide type fuel cell is separated from the flame or the position close to the flame; and
   a mesh-shaped metal or a wire-shaped metal embedded in or fixed to at least one of the anode layer and the cathode layer so as to reinforce the corresponding anode layer or cathode layer.

2. A fuel cell electricity generator according to claim 1, wherein the solid oxide type fuel cell element is flat.

3. A fuel cell electricity generator according to claim 1, wherein the anode layer is arranged on the flame side.

4. A fuel cell electricity generator according to claim 1, wherein the cathode layer is arranged so that it can be exposed to gas containing oxygen.

5. A fuel cell electricity generator according to claim 1, wherein gas containing oxygen is blown onto the cathode layer.

6. A fuel cell electricity generator according to claim 1, wherein the flame is generated when an organic substance is used as fuel.

7. A fuel cell electricity generator according to claim 1, wherein the flame is a premixed flame.

8. A fuel cell electricity generator according to claim 1, wherein the anode layer is composed of a sintered body, the primary component of which is a conductive oxide.

9. A fuel cell electricity generator according to claim 8, wherein the conductive oxide is nickel oxide in which lithium is solidly dissolved.

10. A fuel cell electricity generator, comprising:
    a solid oxide type fuel cell element comprising a solid electrolyte layer having opposing faces, a cathode layer formed on one of faces of the solid electrolyte layer and an anode layer formed on the other face of the solid electrolyte layer;
    means for supplying a flame; and
    means for supplying gas containing oxygen, wherein:
    said element generates electricity when said solid oxide type fuel cell element is disposed in the flame or in a position close to the flame, so that the anode layer is disposed on the flame side and the cathode layer is exposed to the gas containing oxygen, and
    the solid electrolyte layer is made of porous material, the porosity of which is not less than 10%, so that cracks cannot be caused on the solid electrolyte layer by a sudden temperature change in the solid oxide type fuel cell when the solid oxide type fuel cell is arranged in the flame or in the portion close to the flame or when the solid oxide type fuel cell is separated from the flame or the portion close to the flame.

* * * * *